(12) United States Patent
Lauridsen et al.

(10) Patent No.: US 11,083,026 B2
(45) Date of Patent: Aug. 3, 2021

(54) DETERMINING COVERAGE AVAILABILITY ESTIMATES OF MOBILE NON-TERRESTRIAL ACCESS NODE

(71) Applicant: Nokia Technologies Oy, Espoo (FI)

(72) Inventors: Mads Lauridsen, Gistrup (DK); Jeroen Wigard, Klarup (DK); Istvan Zsolt Kovacs, Aalborg (DK); Rafhael Amorim, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/811,210

(22) Filed: Mar. 6, 2020

(65) Prior Publication Data

US 2021/0092781 A1 Mar. 25, 2021

(30) Foreign Application Priority Data

Sep. 25, 2019 (FI) .................................. 20195815

(51) Int. Cl.
*H04W 24/00* (2009.01)
*H04W 4/38* (2018.01)
(Continued)

(52) U.S. Cl.
CPC ........... *H04W 76/10* (2018.02); *H04W 4/029* (2018.02); *H04W 24/02* (2013.01); *H04W 52/0258* (2013.01)

(58) Field of Classification Search
CPC .... H04B 7/8539; H04L 41/112; H04W 24/00; H04W 24/02; H04W 76/18; H04W 4/38
(Continued)

(56) References Cited

U.S. PATENT DOCUMENTS 5,678,174 A 10/1997 Tayloe
5,812,932 A * 9/1998 Wiedeman ......... H04B 7/18539
455/13.1
(Continued)

FOREIGN PATENT DOCUMENTS

CN 108616302 A1 10/2018
EP 0963061 A2 12/1999
(Continued)

OTHER PUBLICATIONS

Terrestrial versus mobile satellite based broadband networks for use in feeding wireless local loop systems by A. Guntsch Published in: Proceedings of 8th International Symposium on Personal, Indoor and Mobile Radio Communications—PIMRC '97, Aug. 2002 (Year: 2002).*

(Continued)

*Primary Examiner* — William D Cumming
(74) *Attorney, Agent, or Firm* — Harrington & Smith

(57) ABSTRACT

There is provided determining an availability of a connection to a mobile non-terrestrial access node of a wireless communication system, determining, at the wireless device, coverage availability estimates of the mobile non-terrestrial access node, and determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

16 Claims, 8 Drawing Sheets

(51) Int. Cl.

| | |
|---|---|
| *H04W 76/18* | (2018.01) |
| *H04W 24/02* | (2009.01) |
| *H04W 76/10* | (2018.01) |
| *H04W 4/029* | (2018.01) |
| *H04W 52/02* | (2009.01) |

(58) Field of Classification Search
USPC .................. 455/13.1, 422.1, 456.1; 370/252
See application file for complete search history.

(56) References Cited

U.S. PATENT DOCUMENTS

| | | | | |
|---|---|---|---|---|
| 6,070,051 | A | 5/2000 | Astrom et al. | |
| 6,157,896 | A | 12/2000 | Castles et al. | |
| 8,942,718 | B2* | 1/2015 | Svendsen | H04L 51/043 455/456.1 |
| 9,800,942 | B2* | 10/2017 | Suzuki | H04H 20/74 |
| 9,848,058 | B2* | 12/2017 | Johnson | H04L 45/308 |
| 10,367,576 | B1 | 7/2019 | Jenkins et al. | |
| 10,728,842 | B2* | 7/2020 | Borean | H04W 48/16 |
| 2002/0196180 | A1* | 12/2002 | Chang | G01S 19/10 342/357.57 |
| 2009/0063187 | A1* | 3/2009 | Johnson | G16H 40/20 705/2 |
| 2009/0245118 | A1* | 10/2009 | McCormick | H04L 41/12 370/252 |
| 2012/0026865 | A1* | 2/2012 | Fan | H04W 24/00 370/225 |
| 2012/0064881 | A1* | 3/2012 | Svendsen | H04L 51/30 455/422.1 |
| 2013/0242785 | A1* | 9/2013 | Guo | H04W 76/18 370/252 |
| 2014/0325569 | A1* | 10/2014 | Suzuki | H04N 21/6193 725/67 |
| 2016/0183098 | A1 | 6/2016 | Lim | |
| 2016/0286410 | A1* | 9/2016 | O'Malley | H04W 24/02 |
| 2018/0216459 | A1* | 8/2018 | Heikkila | G01S 19/28 |
| 2018/0284735 | A1* | 10/2018 | Cella | H04L 1/0041 |
| 2018/0359696 | A1* | 12/2018 | Borean | H04W 4/38 |
| 2019/0121350 | A1* | 4/2019 | Cella | H04L 67/12 |
| 2019/0129410 | A1* | 5/2019 | Cella | H04L 1/1854 |
| 2019/0190589 | A1 | 6/2019 | Montsma et al. | |
| 2019/0324431 | A1* | 10/2019 | Cella | G06N 3/006 |
| 2019/0339688 | A1* | 11/2019 | Cella | G05B 19/41865 |
| 2020/0103894 | A1* | 4/2020 | Cella | G05B 23/0289 |
| 2020/0133254 | A1* | 4/2020 | Cella | G05B 13/028 |
| 2020/0225655 | A1* | 7/2020 | Cella | G06N 3/0472 |
| 2020/0348662 | A1* | 11/2020 | Cella | H04L 1/18 |
| 2021/0092781 | A1* | 3/2021 | Lauridsen | H04B 7/18504 |

FOREIGN PATENT DOCUMENTS

| | | | |
|---|---|---|---|
| WO | WO2015122821 A1 * | 8/2015 | |
| WO | WO 2015/139733 A | 9/2015 | |
| WO | WO-2018112502 A1 | 6/2018 | |
| WO | WO 2019/040964 A1 | 3/2019 | |
| WO | WO 2019/170866 A1 | 9/2019 | |
| WO | WO2020067973 A1 * | 4/2020 | |

OTHER PUBLICATIONS

Signal processing techniques in network-aided positioning: a survey of state-of-the-art positioning designs by Guolin Sun; Jie Chen; Wei Guo; K.J. Ray Liu Published in: IEEE Signal Processing Magazine ( vol. 22, Issue: 4, Jul. 2005) (Year: 2005).*

3GPP TSG-RAN WG2 Meeting #107, R2-1910571, Prague, Czech Republic, Aug. 26-30, 2019, "Inactive state in NTN", Huawei, HiSilicon, 7 pgs.

3GPP TSG-RAN WG2 Meeting #107, R2-1910692, Prague, CZ, Aug. 26-30, 2019, "Report of Email Discussion [106#72] [NR/NTN] TP on NTN-TN Service continuity", Nokia, 17 pgs.

3GPP TR 38.811 V15.1.0 (Jun. 2019), "3$^{rd}$ Generation Partnership Project; Technical Specification Group Radio Access Network; Study on New Radio (NR) to support non-terrestrial networks (Release 15)", sections 1, 4.6, 5.3.3., 7.3.4.1.2, figures 4.6-1, 5.3.3-1, 8 pgs.

LG Electronics Inc. "Dual Connectivity Use Cases in NTN" 3GPP Draft; R2-1911298; 3GPP TSG-RAN WG2 Meeting #107 Prague, Czech Republic, Aug. 26-30, 2019.

3$^{rd}$ Generation Partnership Project; Technical Specification Group Radio Access Network; Solutions for NR to Suppprt Non-Terrestrial Networks (NTN) (Release 16) 3GPP TR 38.821 V0.7.0 (May 2019).

David A. Vallado, Paul Crawford, Richard Hujsak, T.S. Kelso "Revisiting Spacetrack Report #3" AIAA 2006-6753 [retrieved May 17, 2021].

ETSI TS 136 214 V14.2.0 LTE; Evolved Universal Terrestrial Radio Access (E-UTRA); Physical Layer; Measurements (3GPP TS 36.214 version 14.2.0 Release 14) (Apr. 2017).

ETSI TS 138 214 V16.2.0 "5G; NR; Physical Layer Procedures for Data" (3GPP TS 38.214 version 16.2.0 Release 16) (Jul. 2020).

* cited by examiner

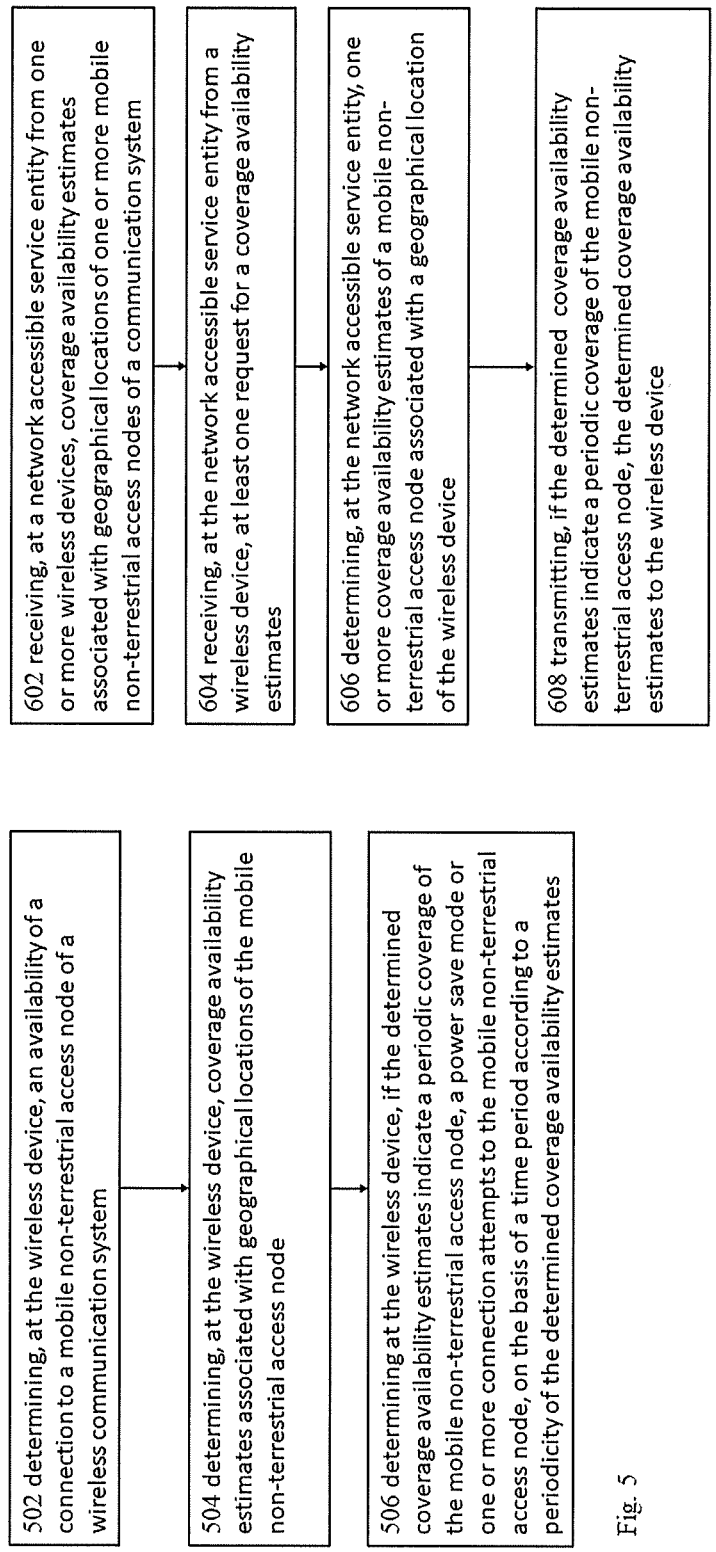

DETERMINING COVERAGE AVAILABILITY ESTIMATES OF MOBILE NON-TERRESTRIAL ACCESS NODE

TECHNICAL FIELD

The present invention relates to coverage availability estimates of a mobile non-terrestrial access node and particularly supporting operation of the wireless device served by a mobile non-terrestrial access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Non-Terrestrial Networks (NTN) comprise low-earth orbit (LEO) satellites, and high-altitude platform stations (HAPS) that provide wireless coverage to wireless devices from their respective trajectories above the earth surface. Since the LEO satellites and HAPS are moving relative to the earth their coverage area is also changing relative to the earth surface.

A wireless device can acquire information regarding coverage availability by performing a cell search procedure. When the wireless device is out of coverage of LEO satellites or HAPSs due to their movement, the cell search procedure regarding coverage of LEO satellites or HAPSs causes unnecessary power consumption.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a wireless device comprising:
means for determining, at the wireless device, an availability of a connection to a mobile non-terrestrial access node of a wireless communication system;
means for determining, at the wireless device, coverage availability estimates associated with geographical locations of the mobile non-terrestrial access node; and
means for determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

According to a second aspect there is provided a network accessible service entity, comprising:
means for receiving, at the network accessible service entity from one or more wireless devices, coverage availability estimates associated with geographical locations of one or more mobile non-terrestrial access nodes of a communication system; and
means for receiving, at the network accessible service entity from a wireless device, at least one request for coverage availability estimates of the mobile non-terrestrial access nodes;
means for determining, at the network accessible service entity, one or more coverage availability estimates of a mobile non-terrestrial access node associated with a geographical location of the wireless device; and
means for transmitting, if the determined coverage availability estimates indicate a periodic coverage of the mobile non-terrestrial access node, the determined coverage availability estimates to the wireless device.

According to a third aspect there is provided a method comprising:
determining, at a wireless device, an availability of a connection to a mobile non-terrestrial access node of a wireless communication system;
determining, at the wireless device, coverage availability estimates associated with geographical locations of the mobile non-terrestrial access node; and
determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

According to a fourth aspect there is provided a method comprising:
receiving, at a network accessible service entity from one or more wireless devices, coverage availability estimates associated with geographical locations of one or more mobile non-terrestrial access nodes of a communication system; and
receiving, at the network accessible service entity from a wireless device, at least one request for coverage availability estimates of the mobile non-terrestrial access nodes;
determining, at the network accessible service entity, one or more coverage availability estimates of a mobile non-terrestrial access node associated with a geographical location of the wireless device; and
transmitting, if the determined coverage availability estimates indicate a periodic coverage of the mobile non-terrestrial access node, the determined coverage availability estimates to the wireless device.

According to a fifth aspect there is provided a wireless device comprising:
a processor; and
a transceiver;
wherein the processor is configured to:
determine an availability of a connection to a mobile non-terrestrial access node of a wireless communication system;
determine coverage availability estimates associated with geographical locations of the mobile non-terrestrial access node; and
determine, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

According to a sixth aspect there is provided a network accessible service entity comprising:
a processor; and
a transceiver;

wherein the processor is configured to:
control the transceiver to receive from one or more wireless devices coverage availability estimates associated with geographical locations of one or more mobile non-terrestrial access nodes of a communication system; and
control the transceiver to receive from a wireless device at least one request for coverage availability estimates of the mobile non-terrestrial access nodes;
determine one or more coverage availability estimates of a mobile non-terrestrial access node associated with a geographical location of the wireless device; and
control the transceiver to transmit, if the determined coverage availability estimates indicate a periodic coverage of the mobile non-terrestrial access node, the determined coverage availability estimates to the wireless device.

According to a seventh aspect there is provided a computer program comprising computer readable program code means adapted to perform at least the following:
determining, at a wireless device, an availability of a connection to a mobile non-terrestrial access node of a wireless communication system;
determining, at the wireless device, coverage availability estimates associated with geographical locations of the mobile non-terrestrial access node; and
determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

According to a eighth aspect there is provided computer program comprising computer readable program code means adapted to perform at least the following:
receiving, at a network accessible service entity from one or more wireless devices, coverage availability estimates associated with geographical locations of one or more mobile non-terrestrial access nodes of a communication system; and
receiving, at the network accessible service entity from a wireless device, at least one request for coverage availability estimates of the mobile non-terrestrial access nodes;
determining, at the network accessible service entity, one or more coverage availability estimates of a mobile non-terrestrial access node associated with a geographical location of the wireless device; and
transmitting, if the determined coverage availability estimates indicate a periodic coverage of the mobile non-terrestrial access node, the determined coverage availability estimates to the wireless device.

According to a ninth aspect, there is provided a computer program according to an aspect embodied on a computer readable medium.

According to one or more further aspects, embodiments according to the first, second, third, fourth, fifth, sixth, seventh, eighth and ninth aspect comprise one or more features of:
  means for entering, by the wireless device, if the determined coverage availability estimates fail to indicate the periodic coverage of the mobile non-terrestrial access node, the power saving mode for a time period that is less than an estimated periodicity of the determined coverage availability estimates
  means for entering, by the wireless device, if the wireless devices has been out of coverage of the mobile non-terrestrial access node for a time period that exceeds a threshold value, the power save mode for a time period according to the periodicity of the determined coverage availability estimates
  means for determining, in response to detecting a movement of the wireless device, at least one coverage availability estimate
  means for determining, at the wireless device, whether the wireless device is within a coverage area of the mobile non-terrestrial access node; means for determining, at the wireless device, if the wireless device is within the coverage area, a coverage availability estimate to indicate an availability of a coverage of the mobile non-terrestrial access node; and means for determining, at the wireless device, if the wireless device is not within the coverage area, a coverage availability estimate to indicate an unavailability of a coverage of the mobile non-terrestrial access node
  wherein the coverage availability estimates indicate at least one of an availability, an unavailability and a likelihood of coverage of the mobile non-terrestrial access node at geographical locations of the mobile non-terrestrial access node
  means for transforming the coverage availability estimates indicating a likelihood of coverage into a throughput estimate and/or a latency estimate; means for determining one or more time slots for a data transmission on the basis of the throughput estimate and/or the latency estimate; and means for causing the data transmission on the determined time slots to the mobile non-terrestrial access node.
  wherein the coverage availability estimates are at least partially determined at the wireless device on the basis of one or more measurements of at least one of signal strength and a signal quality of the mobile non-terrestrial access node
  wherein the coverage availability estimates are at least partially determined by a network accessible service entity, the wireless device comprising: means for transmitting, by the wireless device, a request for coverage availability estimates of one or more mobile non-terrestrial access nodes to a network accessible service entity; and means for receiving, at the wireless device, the coverage availability estimates of the mobile non-terrestrial access node associated with a current geographical location of the wireless device from the network accessible service entity
  means for receiving, at the wireless device, ephemeris data for the mobile non-terrestrial access node; means for determining, at the wireless device, a geographical location of the mobile non-terrestrial access node on the basis of the received ephemeris data; and means for storing the determined coverage availability estimates in association with at least part of the received ephemeris data and the determined geographical location of the mobile non-terrestrial access node
  means for determining a transmission time instant for transmitting the determined coverage availability estimates according to a periodicity of the determined coverage availability estimates
  means for transforming the coverage availability estimates indicating a likelihood of coverage into a throughput estimate and/or a latency estimate; means for determining one or more time slots for a data transmission on the basis of the throughput estimate and/or the latency estimate; and means for causing the data transmission on the determined time slots to the wireless device means for receiving, at the network accessible service entity, ephemeris data for the mobile non-terrestrial access nodes; means for determining, at the network accessible service entity, geographical locations of the mobile non-terrestrial access nodes on the basis of the received ephemeris data; and means for storing the received coverage availability estimates in association with at least part of the received ephemeris data and the geographical location of the mobile non-terrestrial access nodes.

At least some embodiments facilitate determining when services of the mobile non-terrestrial access node may be utilized by a wireless device. In this way efficient operation of the wireless device at least in terms of power consumption, interference mitigation and/or user experience may be supported.

BRIEF DESCRIPTION OF THE DRAWINGS

For a more complete understanding of example embodiments of the present invention, reference is now made to the following descriptions taken in connection with the accompanying drawings in which:

FIG. 5 illustrates an example of a method in accordance with at least some embodiments of the present invention;

FIG. 6 illustrates an example of a method in accordance with at least some embodiments of the present invention.

DETAILED DESCRIPTION OF SOME EXAMPLE EMBODIMENTS

Figure 1:
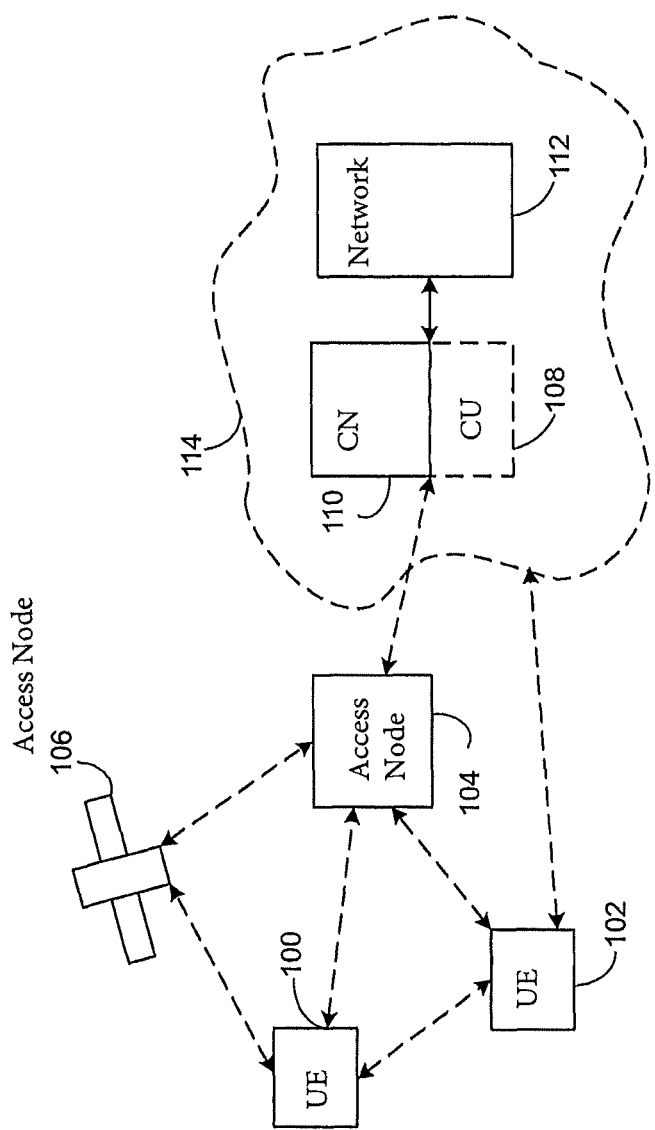
FIG. 1 shows a part of an exemplifying wireless communications access network in accordance with at least some embodiments of the present invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In connection with a wireless communication system comprising one or more mobile non-terrestrial access nodes there is provided determining, at a wireless device, an availability of a connection to a mobile non-terrestrial access node and determining coverage availability estimates associated with geographical locations of the mobile non-terrestrial access node. If the determined coverage availability estimates indicate a periodic coverage of the mobile non-terrestrial access node, a power save mode is entered or one or more data transmission attempts are controlled on the basis of a time period according to a periodicity of the determined coverage availability estimates. The periodic coverage of the mobile non-terrestrial access node facilitates determining when services of the mobile non-terrestrial access node may be utilized by the wireless device. In this way efficient operation of the wireless device at least in terms of power consumption, interference mitigation and/or user experience may be supported. The period coverage of the mobile non-terrestrial access node may facilitate determining at least: when a wireless device should initiate a connection attempt to a mobile non-terrestrial access node, when the wireless device should not initiate a connection attempt to the mobile non-terrestrial access node, when a wireless device should enter a power saving mode and/or when a wireless device should leave a power saving mode.

A mobile non-terrestrial access node may be an NTN node. The NTN may be an access network or at least a part of an access network of a communication system. The mobile non-terrestrial access node provides wireless access to wireless devices on the Earth surface in a coverage area of the mobile non-terrestrial access node. In this way the wireless devices within the coverage area of the mobile non-terrestrial access node may access the communication system via the mobile non-terrestrial access node. The mobile non-terrestrial access node is configured for wireless communications with wireless devices. The wireless communications may be performed over a wireless connection on one or more communication channels in a cell of the mobile non-terrestrial access node. The wireless communications may be performed according to various transmission technologies that may utilize radio frequencies. Examples of the transmission technologies are described further below. Examples of the mobile non-terrestrial access node comprise a relay station or a base station. The base station may be for example a gNB, that is located on an airborne or spaceborne vehicle, for example a low earth orbit (LEO) satellite or a high altitude platform (HAPS). Mobile non-terrestrial access nodes are moving relative to the Earth surface, whereby their coverage area on the Earth surface is changing as they move over the Earth surface. It should be appreciated that a mobile non-terrestrial access node, such as a gNB located on a HAPS, may comprise means for moving relative to the Earth surface such as one or more motors and propellers for causing the movement of the mobile non-terrestrial access node. On the other hand, some mobile non-terrestrial access nodes may be moving relative to the Earth without necessarily having any controlled means for moving relative to the Earth surface. Due to the movement with relative to the Earth surface, deployments of the mobile non-terrestrial access nodes such as LEO satellites and HAPSs may not provide continuous coverage for a given area on the Earth surface. For example, a number of deployed LEO satellites may only provide coverage at specific points in time in accordance with their orbit. Similarly, HAPSs may be deployed for local coverage. For example, the HAPS, may be deployed using balloons or planes, will follow a predefined flight path, e.g. circular or FIG. 8, to cover a specific area. Therefore, the wireless devices may be out of coverage area of the mobile non-terrestrial access nodes which makes controlling when to enter a power save mode and/or when to make a connection attempt challenging for the wireless devices. In case a wireless device has received service from a mobile non-terrestrial access node, the wireless should know when the service is available again. If the wireless device does not have this information it may make a connection attempt, e.g. Radio Resource Control protocol (RRC) Connection Reestablishment or cell (re-) selection, without being in coverage of the cell of the mobile non-terrestrial access node (or any other cell). Thus, it could waste a significant amount of energy searching for cells which are not currently available. Also, unnecessary connection attempts, when there is no coverage by the mobile non-terrestrial access nodes, causes interference to nearby wireless devices, access nodes and networks. Moreover, inefficient utilization of the power save mode causes unnecessary power consumption in the wireless devices, which may be challenging at least for wireless devices that have a limited power supply such a battery. A coverage availability estimate indicates whether a wireless device is within a coverage area of a mobile non-terrestrial access node or not at a given time. The coverage availability estimate may indicate availability, unavailability or a likelihood of coverage at a geographical location or within a geographical area. A coverage availability estimate indicates whether a wireless device is within a coverage area of a mobile non-terrestrial access node or not at a given time. The coverage availability estimate may indicate availability, unavailability or a likelihood of coverage at a geographical location or within a geographical area. The coverage availability estimate may indicate additionally at least some of an availability for given service quality (e.g. data rate and/or latency), availability of a selected/configured frequency band (because in NR maybe there will several frequency bands FR1, FR2, etc. used from the same satellite cell), availability of a certain Radio Access Technology type (LTE, 5G) or sub-type LEO, or sub-type Medium Earth Orbiting satellite, GEO, etc. The geographical location and geographical area may be determined on the basis of a geographical location or a geographical area, where an observer device, e.g. a wireless device, has determined the coverage availability estimate. The geographical location or area may be determined for example on the basis of at least one of a current geographical location of the wireless device, an identified, e.g. cell_ID, of last/current serving cell of the wireless device and beam identifier together with time information. A geographical location may be expressed in global navigation Satellite System (GNSS) coordinates, for example. When the coverage availability is determined, the mobile non-terrestrial access node is at a location on its trajectory/flight path, which may be converted into a geographical location on the basis of ephemeris data of the mobile non-terrestrial access node. The ephemeris data also gives the trajectory or a flight path of the mobile non-terrestrial access node. Accordingly, the coverage availability estimate may be associated with one or more of a geographical area of the wireless device on the Earth surface, a geographical location of the mobile non-terrestrial access node and a periodicity of a trajectory or a flight path of the mobile non-terrestrial access node. Examples of forms of trajectories of mobile non-terrestrial access nodes comprise a circular and FIG. 8 as viewed from above towards the Earth surface, as well as a trajectory, i.e. orbit, around the Earth for satellite systems.

A power save mode may refer to an operation mode of a wireless device or a part of the wireless device, where a power consumption may be reduced with respect to another operation mode. An example of a power save mode is a sleep mode after which the wireless device or a part of the wireless device wakes up to an operation mode having a higher power consumption. Accordingly, when a power save mode is entered, a current power consumption of the wireless device or a part of the wireless device is reduced. Operation of the wireless device or a part of the wireless device in the power save mode may be changed with respect to an operation mode that has a higher power consumption such that the power consumption may be reduced. Examples of the changes comprise switching off power from one or more units and/or reducing an amount of operations performed by the wireless device or a part of the wireless device. In an example, in the power save mode coverage availability estimates may not be determined or the coverage availability estimates are determined with increased time periods between successive operations for determining the coverage availability estimates.

A power save mode may be determined on the basis of a time period. The time period may determine how long a wireless device or a part of the wireless device is maintained in the power save mode. When the time period has passed or is about to pass, the wireless device or a part of the wireless device may enter an operation mode that has a higher power consumption.

A connection attempt may be an attempt by a wireless device to establish a wireless control connection or a wireless data transmission connection with a mobile non-terrestrial access node. A control connection may be a Radio Resource Control protocol (RRC) connection. It should be appreciated that also other protocols may be used which are capable of configuring user plane and control plane for the wireless device and implementing Radio Resource Management functionalities. A data transmission connection may be an uplink data transmission for example on a Physical Uplink Shared Channel. It should be appreciated that also other uplink channels, either dedicated or shared, communications channels are viable.

Ephemeris data provides determining a geographical location of the mobile non-terrestrial access node, for example in accordance with 3GPP TR 38.821 V0.7.0 (2019 May) appendix A.1, Table A.1-1 and Table A.1-2. Key parameters of orbital mechanics of all commercial satellites are publicly available from multiple sources. This information is called ephemeris, which is used by astronomers to describe the location and orbital behavior of stars and any other astronomic bodies. Typically, ephemeris is expressed in an ASCII file using Two-Line Element (TLE) format. The TLE data format encodes a list of orbital elements of an Earth-orbiting object in two 70-column lines. The contents of the TLE table are reproduced below.

TABLE 1

| | First line of the ephemeris | |
|---|---|---|
| Field | Columns | Content |
| 1 | 01-01 | Line number (1) |
| 2 | 03-07 | Satellite number |
| 3 | 08-08 | Classification (U = Unclassified) |
| 4 | 10-11 | International Designator (Last two digits of launch year) |
| 5 | 12-14 | International Designator (Launch number of the year) |
| 6 | 15-17 | International Designator (piece of the launch) |
| 7 | 19-20 | Epoch Year (last two digits of year) |
| 8 | 21-32 | Epoch (day of the year and fractional portion of the day) |
| 9 | 34-43 | First Time Derivative of the Mean Motion divided by two |
| 10 | 45-52 | Second Time Derivative of Mean Motion divided by six (decimal point assumed) |

TABLE 1-continued

First line of the ephemeris

| Field | Columns | Content |
|---|---|---|
| 11 | 54-61 | BSTAR drag term (decimal point assumed) |
| 12 | 63-63 | The number 0 (originally this should have been "Ephemeris type") |
| 13 | 65-68 | Element set number. Incremented when a new TLE is generated for this object. |
| 14 | 69-69 | Checksum (modulo 10) |

TABLE 2

Second line of the ephemeris

| Field | Columns | Content |
|---|---|---|
| 1 | 01-01 | Line number (2) |
| 2 | 03-07 | Satellite number |
| 3 | 09-16 | Inclination (degrees) |
| 4 | 18-25 | Right ascension of the ascending node (degrees) |
| 5 | 27-33 | Eccentricity (decimal point assumed) |
| 6 | 35-42 | Argument of perigee (degrees) |
| 7 | 44-51 | Mean Anomaly (degrees) |
| 8 | 53-63 | Mean Motion (revolutions per day) |
| 9 | 64-68 | Revolution number at epoch (revolutions) |
| 10 | 69-69 | Checksum (modulo 10) |

The TLE format is an expression of mean orbital parameters "True Equator, Mean Equinox", filtering out short term perturbations. From its TLE format data, the SGP4 (Simplified General Propagation) model, defined in AIAA 2006-6753: "Revisiting Spacetrack Report #3, Models for Propagation of NORAD Element Sets", David A. Vallado, Paul Crawford, Richard Hujsak, T. S. Kelso, presented at the AIAA/AAS Astrodynamics Specialist Conference, Keystone, Colo., 2006 Aug. 21-24, 2006, may be used to calculate the location of a mobile non-terrestrial access node, e.g. a gNB located on a LEO satellite or a HAPS, moving with respect to the earth in True Equator Mean Equinox (TEME) coordinate. Then it can be converted into the Earth-Centered, Earth-Fixed (ECEF) Cartesian x, y, z coordinate as a function of time. The instantaneous velocity at that time can also be obtained. In ECEF coordinate, z-axis points to the true North, while x axis and y axis intersects 0-degrees latitude and longitude respectively as illustrated in the TR 38.821 Figure A.1-1. Given a specific point in time, it is straightforward to calculate the mobile non-terrestrial access node location by interpolation.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), BLUETOOTH®, personal communications services (PCS), ZIGBEE®, wideband code division multiple access (WCDMA), systems using ultrawideband (UWB) technology, sensor networks, mobile ad-hoc networks (MANETs) and Internet protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 1904) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize non-terrestrial nodes 106, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 3:
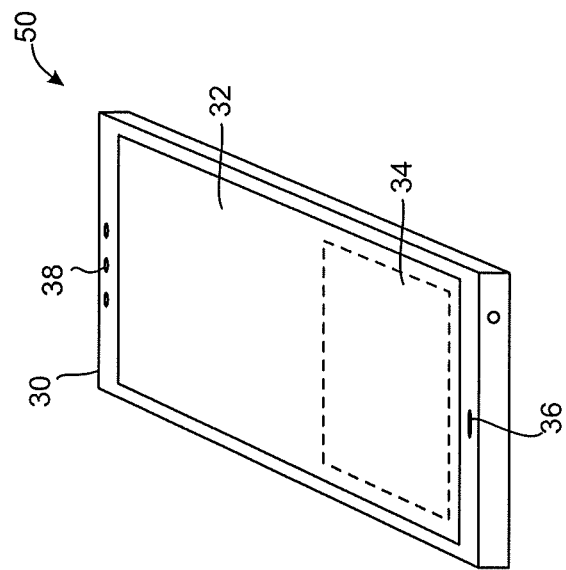
FIG. 3 shows an apparatus in accordance with at least some embodiments of the present invention.
Figure 2:
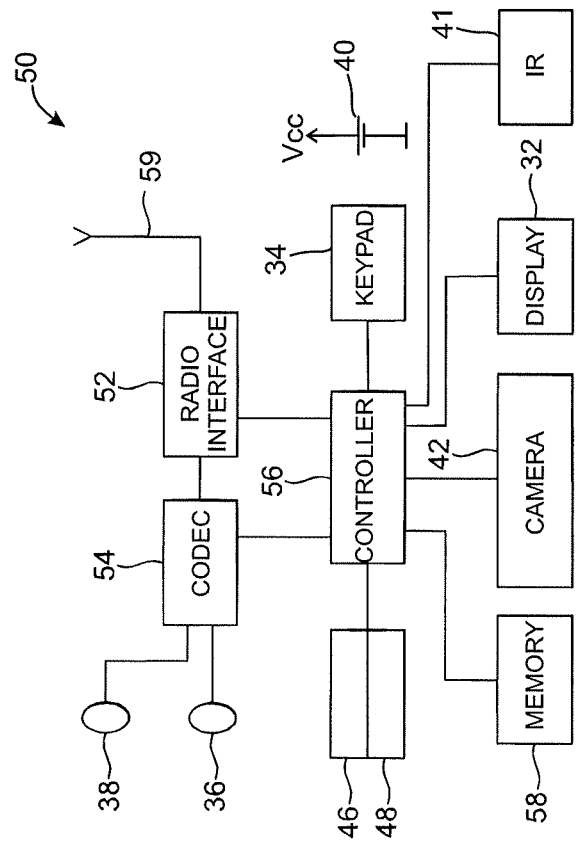
FIG. 2 shows a block diagram of an apparatus in accordance with at least some embodiments of the present invention.

The following describes in further detail suitable apparatus and possible mechanisms for implementing some embodiments. In this regard reference is first made to FIG. 2 which shows a schematic block diagram of an exemplary apparatus or electronic device 50 depicted in FIG. 3, which may incorporate a transmitter according to an embodiment of the invention.

The electronic device 50 may for example be a wireless device, mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a BLUETOOTH® wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 (also can be called as radio frequency module) connected to the controller (or the processor) and suitable for generating wireless communication signals for example for communication with a cellular communications network, a wireless communications system or a wireless local area network. The radio interface circuitry 52 includes one or more transmitters and one or more receivers. In this case, the transmitter and the receiver can be configured to one entity such as a radio transceiver. The apparatus 50 may further comprise an antenna 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 4:
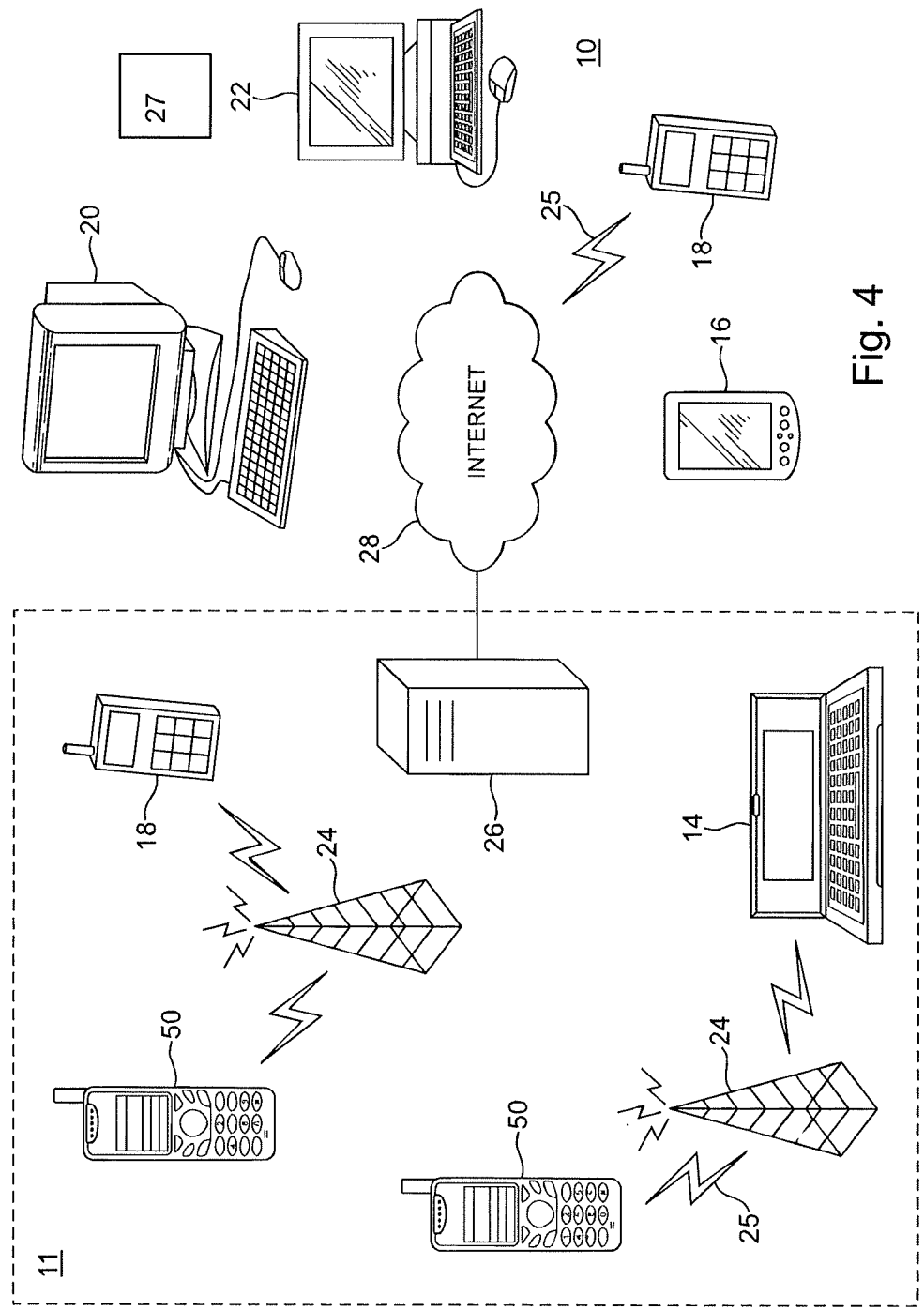
FIG. 4 shows an example of an arrangement for wireless communications comprising a plurality of apparatuses, networks and network elements.

With respect to FIG. 4, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a BLUETOOTH® personal area network, an Ethernet local area network, a token ring local area network, a wide area network, and the Internet.

For example, the system shown in FIG. 4 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, a network accessible service entity (SE) 27, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The network accessible service entity may be a cloud service that may be accessed by the communication devices connected to the Internet or the mobile telephone network 11 over wired or wireless connections. The network accessible service entity may maintain and update a database of coverage availability estimates that may be received from wireless devices, whereby the coverage availability estimates may be shared between the wireless devices. The wireless devices may opt to use the cloud database as additional source of information, or rely entirely on it and be freed from the processing needed for determining and storing coverage availability estimates locally at the wireless devices.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-Internet protocol (TCP-IP), short messaging service (SMS), multimedia messaging service (MMS), email, instant messaging service (IMS), BLUETOOTH®, IEEE 802.11, Long Term Evolution wireless communication technique (LTE) and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

FIG. 5 illustrates an example of a method in accordance with at least some embodiments of the present invention. The method may be performed by a wireless device for example. The method provides that operation of the wireless device may be adapted to take into account movement of the mobile non-terrestrial access node.

Phase 502 comprises determining at the wireless device, an availability of a connection to a mobile non-terrestrial access node of a wireless communication system.

In an example, phase 502 comprises determining an availability metric. The availability metric may facilitate determining coverage availability estimates indicating availability, unavailability or a likelihood of coverage at a geographical location or within a geographical area. The coverage availability estimate may indicate additionally at least some of an availability for given service quality (e.g. data rate and/or latency), availability of a selected/configured frequency band (because in NR maybe there will several frequency bands FR1, FR2, etc. used from the same satellite cell), availability of a certain Radio Access Technology type (LTE, 5G) or sub-type LEO, or sub-type Medium Earth Orbiting satellite, GEO, etc.

Phase 504 comprises determining, at the wireless device, coverage availability estimates associated with geographical locations of the mobile non-terrestrial access node.

Phase 506 comprises determining at the wireless device, if the determined coverage availability estimates indicate a periodic coverage of the mobile non-terrestrial access node, a power save mode or one or more data transmission attempts to the mobile non-terrestrial access node, on the basis of a time period according to a periodicity of the determined coverage availability estimates. In this way, the wireless device has information regarding when the services of the mobile non-terrestrial access node may be utilized by the wireless device. This provides efficient operation of the wireless device at least in terms of power consumption, interference mitigation and/or user experience may be supported. Moreover, the wireless device may optimize the transmission time of its payload based on the estimated data amount and the time where the connection to the mobile non-terrestrial access node is the strongest, e.g. in terms of RSRP or RSRQ including a potential safety margin.

In an example in accordance with at least some embodiments, phase 504 comprises that the coverage availability estimates indicate at least one of an availability, an unavailability and a likelihood of coverage of the mobile non-terrestrial access node at geographical locations of the mobile non-terrestrial access node. Efficiency of operation of the wireless may be particularly supported by coverage availability estimates indicating a likelihood of coverage, since the transmissions may be scheduled based on the coverage likelihood estimates at time instants with the highest likelihood of coverage of the mobile non-terrestrial access node. This is particularly useful for wireless devices with limited power sources and for which data transmission is highly deterministic such as Internet of things devices, IoT-devices.

In an example in accordance with at least some embodiments, phase 504 that the coverage availability estimates are at least partially determined at the wireless device on the basis of one or more measurements of at least one of signal strength and a signal quality of the mobile non-terrestrial access node. In an example a signal strength may be measured by performing one or more measurements for received signal strength from the mobile non-terrestrial access node. Examples of signal strength measurements comprise a Received Signal Strength Indicator (RSSI) measurement, a Reference Signal Received Power (RSRP) measurement. A signal quality may be measured on the basis of a Reference Signal Received Quality measurement. The signal strength measurements and/or the signal quality measurement may be performed on the basis of primary synchronization signals (PSSs) from the mobile non-terrestrial access node, Secondary Synchronization Signals (SSSs) from the mobile non-terrestrial access node or both.

In an example in accordance with at least some embodiments, the coverage availability estimates are at least partially determined by a network accessible service entity and the phase 504 comprises transmitting, by the wireless device, a request for coverage availability estimates of one or more mobile non-terrestrial access nodes to a network accessible service entity, and receiving, at the wireless device, the coverage availability estimates of the mobile non-terrestrial access node associated with a current geographical location of the wireless device from the network accessible service entity. In this way the wireless device may utilize coverage availability estimates that are shared by the network accessible service entity. The coverage availability estimates shared by the network accessible service entity may have been uploaded to the network accessible service entity by the wireless device or other wireless devices. Utilizing the coverage availability estimates shared by the network accessible service entity provides that the wireless device does not necessarily have to determine the coverage availability estimates itself or at least the time for determining coverage availability estimates that indicate a periodic coverage of the mobile non-terrestrial access node may be reduced such that the wireless device may start using a periodicity of the determined coverage availability estimates for controlling data transmission attempts, entering a power save mode and/or waking up from the power save mode.

In an example in accordance with at least some embodiments, phase 504 comprises transforming the coverage availability estimates indicating a likelihood of coverage into a throughput estimate The signal strength measurements and/or the signal quality measurement may be performed on the basis of primary synchronization signals (PSSs), Secondary Synchronization Signals (SSSs) or both. In an example if the RSRP is greater than a threshold for the power P1, a coverage availability estimate may be determined to indicate an availability of a coverage of the mobile non-terrestrial access node. On the other hand, if the RSRP is less than a threshold for the power P2, a coverage availability estimate may be determined to indicate an unavailability of a coverage of the mobile non-terrestrial access node. It should be appreciated that since wireless devices may employ different antennas and Radio Frequency (RF) front ends, their needs in terms of radio coverage may vary and therefore the thresholds P1 and P2 for the power are implementation specific parameters. In an example, one or more of the thresholds P1 and P2 may be determined at a wireless device on the basis of receiver sensitivity, potentially with an added margin, of the wireless device. The value of the margin may be known/estimated and configured to the wireless device during development of the wireless device.

Since wireless devices may have differences, for example in receiver sensitivities, the threshold for determining an availability or unavailability of coverage, P1 and P2, may be specific to each wireless device. The geographical location of the mobile non-terrestrial access node may be noted for each coverage availability estimate and stored in association with the determined coverage availability estimate. The geographical location of the mobile non-terrestrial access node may be determined based on ephemeris data in accordance with at least some embodiments.

It should be appreciated that depending on configuration of a wireless device, for example antenna and RF front end of the wireless device, different wireless devices may have different requirements in terms of wireless coverage. Therefore, a threshold power of the mobile non-terrestrial access node for determining a coverage availability estimate and/or whether the wireless device is within a coverage area of the mobile non-terrestrial access node may be implementation specific and/or service specific. In an example the wireless device may determine the threshold power or receiver sensitivity potentially with an added margin. The threshold power value may be known/estimated to the wireless device vendor during development of the wireless device.

In an example in accordance with at least some embodiments, phase 504 comprises that at least one coverage availability estimate is determined in response to detecting a movement of the wireless device. In this way a new coverage availability estimate may be determined, if one or more coverage availability estimates have become outdated because a movement of the wireless device. However, since the coverage area of a mobile non-terrestrial access node is large, the movement of the wireless device may need to be significant before the estimate is no longer valid. It should be appreciated that the movement may be detected by the wireless device for example by observing that one or more coverage availability estimates no longer match the actual coverage of the mobile non-terrestrial access node. In an example, phase 504 may comprise the wireless device constructing or building a coverage availability map. A geographical location of the wireless device may be correlated with the determined coverage availability estimate for building the coverage availability map. Furthermore, if the wireless device is moving it may add the coverage availability estimates to different points in the map.

In an example phase 504 may comprise that the coverage availability estimate is sampled using a sampling time interval x [ms]. When the coverage availability estimate indicates a periodic coverage of the mobile non-terrestrial access node, the sampling time interval may be longer than when the coverage availability estimate does not indicate a periodic coverage. The coverage availability estimate may indicate a periodic coverage at least when a sufficient number of samples of the coverage availability estimate have been determined such that the periodicity of the coverage availability estimate may be determined. The sampling time interval x may depend on the wireless device's current energy and traffic profiles. If the wireless device has a good energy source it may choose to sample often, and this is also valid if the wireless device is frequently performing data transfers with the serving cell, because signal strength measurements may be needed to maintain the Channel State Information.

In an example, phase 504 may comprise that one or more parameters for determining a coverage availability may be determined by a central entity for controlling wireless devices. the parameters may be signaled to a wireless device by application layer signaling. Examples of the parameters comprise a sampling time interval x, a counter y and an unavailability threshold z. The sampling time interval x may define how often the wireless device determines a coverage availability estimate, e.g. performs one or more measurements for signal strength and/or signal quality. The counter y together with the unavailability threshold z may determine how fast the wireless device may enter a power saving mode. Once unavailability of coverage of the mobile non-terrestrial access node has been observed for y that is greater or equal to z, the wireless device may enter a power saving mode. Determining the parameters by the central entity may be useful for a managed service of IoT devices where the intelligence is located centrally. In an example, the wireless device may share one or more determined coverage availability estimates with one or more other wireless device via a wireless device-to-device link. Alternatively or additionally, the wireless device may share one or more determined coverage availability estimates with one or more other wireless devices via a network accessible service entity. The device-to-device link may be in accordance with 3GPP or non-3GPP communication technology.

FIG. 6 illustrates an example of a method in accordance with at least some embodiments of the present invention. The method may be performed by a network accessible service entity for example. The method provides that operation of a wireless device may be adapted to take into account movement of a mobile non-terrestrial access node.

Phase 602 comprises receiving, at the network accessible service entity from one or more wireless devices, coverage availability estimates associated with geographical locations of one or more mobile non-terrestrial access nodes of a communication system.

Phase 604 comprises receiving, at the network accessible service entity from a wireless device, at least one request for coverage availability estimates of the mobile non-terrestrial access nodes.

Phase 606 comprises determining, at the network accessible service entity, one or more coverage availability estimates of a mobile non-terrestrial access node associated with a location of the wireless device.

Phase 608 comprises transmitting, if the determined coverage availability estimates indicate a periodic coverage of the mobile non-terrestrial access node, the determined coverage availability estimates to the wireless device.

Since the network accessible service entity provides the coverage availability estimates associated with the location of the wireless device, the wireless device does not necessarily need to determine the coverage availability estimate itself, whereby procedures such as measurements for signal strength and/or signal quality for determining the coverage availability estimates may be at least partly omitted at the wireless device. Therefore, the network accessible service entity facilitates adapting operation of the wireless device according to the periodicity of the coverage provided by the mobile non-terrestrial access node. When the wireless device receives the coverage availability estimates from the network accessible service entity and also determines coverage availability estimates determined locally by itself, the coverage availability estimates determined locally may be combined with the coverage availability estimates received from the network accessible service entity. The combined coverage availability estimates may provide coverage availability estimates associated with an increased number of geographical locations and/or coverage availability estimates associated with the same or substantially the same location may be averaged to form a single coverage availability estimate for the geographical location.

In an embodiment phase 606 comprises receiving, at the network accessible service entity, ephemeris data for the mobile non-terrestrial access nodes, determining, at the network accessible service entity, geographical locations of the mobile non-terrestrial access nodes on the basis of the received ephemeris data, storing the received coverage availability estimates in association with at least part of the received ephemeris data and the geographical location of the mobile non-terrestrial access nodes. In this way the network accessible service entity may associate the geographical locations of the mobile non-terrestrial access nodes with the received coverage availability estimates from the wireless devices.

In an example according to at least some embodiments phase 602, the coverage availability estimates from the wireless devices may be associated with locations of the wireless devices or estimates of the locations of the wireless devices. Information indicating locations of the wireless devices may be received together with the coverage availability estimates of the network accessible service entity may estimate the location of the wireless devices. The information indicating a location of a wireless device may comprise at least one of a current geographical location of the wireless device, an identified, e.g. cell_ID, of last/current serving cell of the wireless device and beam identifier together with time information. At least one of at least one of a current geographical location of the wireless device, an identified, e.g. cell_ID, of last/current serving cell of the wireless device and beam identifier together with time information, may be used for determining the location of the wireless device either directly or indirectly by estimating the location of the wireless device. In an example, the network accessible service entity may be a cloud application executed on an application server. The network accessible service entity may be responsible to combine, clean up and update a database of coverage availability estimates received, or a "crowdsourced", from wireless devices.

In an example in accordance with at least some embodiments, the phase 606 comprises transforming the coverage availability estimates indicating a likelihood of coverage into a throughput estimate. Then phase 608 comprises determining one or more time slots for a data transmission on the basis of the throughput estimate, and causing the data transmission on the determined time slots to the mobile non-terrestrial access node. In this way the data transmissions from the network accessible service entity to the wireless device may be performed, such that the number of required transmissions and/or the data rate may be kept at acceptable levels and thus supporting power saving at the wireless device.

In an example, phase 606 comprises the wireless device requesting the mobile non-terrestrial access node for one or more time slots for the data transmission and when the wireless device receives a scheduling grant for the one or more time slots, the wireless device may initiate the data transmission.

Figure 7:
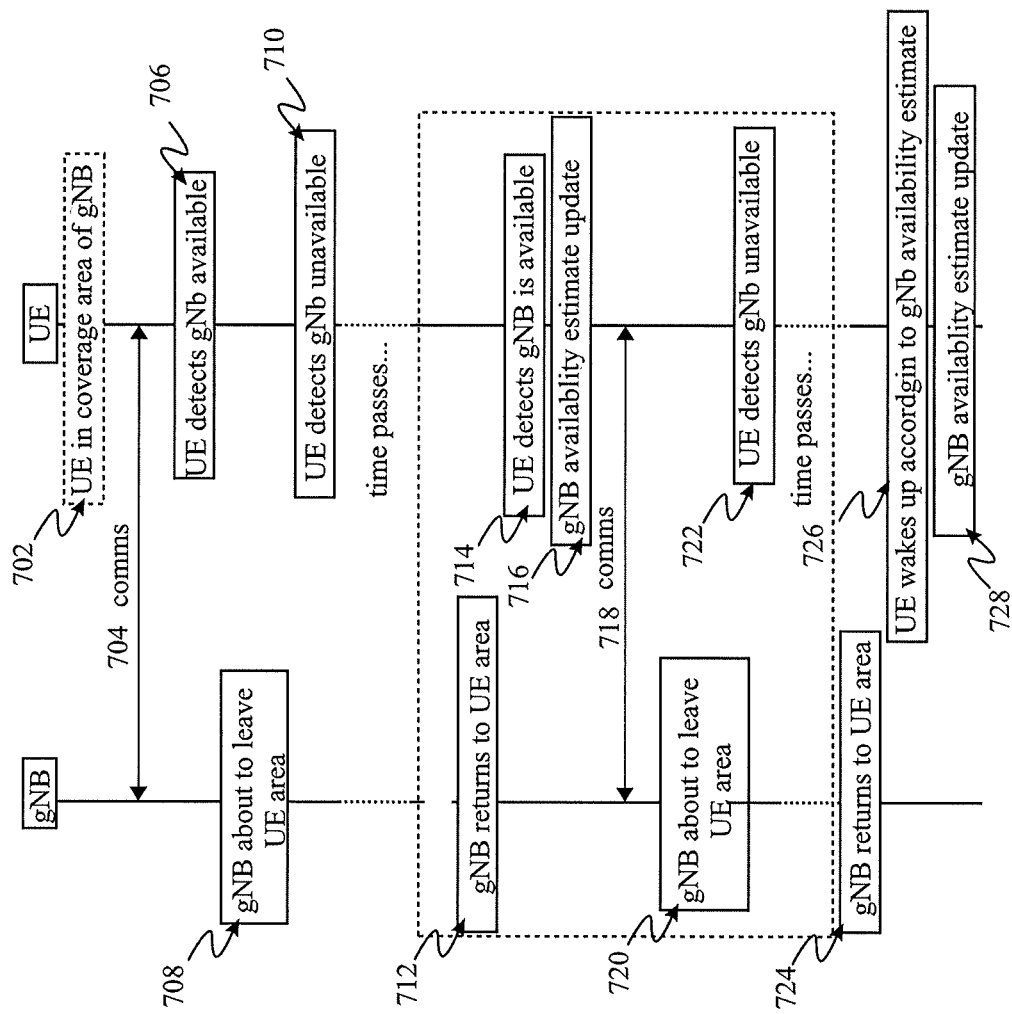
FIG. 7 illustrates an example of a sequence in accordance with at least some embodiments of the present invention.

FIG. 7 illustrates an example of a sequence in accordance with at least some embodiments of the present invention. The sequence is illustrated between a wireless device, e.g. UE, and a mobile non-terrestrial access node, e.g. gNB located on a LEO satellite or a HAPS or relayed through a LEO or HAPS.

Phase 702 comprises the UE arriving within the coverage area of the gNB. Since the gNB may be moving the UE may be within the coverage area of the gNB for a time period that is periodic. Accordingly, when the gNB is moved, the UE may be out of coverage area, but the UE may be again be within the coverage area of the gNB after the time period has passed. The time period may be characteristic to a route that is repeated by the gNB above the Earth surface. Movement of the UE itself may be relatively small with respect to the movement of the gNB, at least when the UE is on the ground.

Phase 704 comprises communications between the UE and the gNB. The communications may comprise signaling and/or data transmission. Examples of the signaling comprise gNB transmitting system information for facilitating synchronization for the UE to the gNB, the UE performing one or more signal strength measurements, the UE performing one or more signal quality measurements, the UE performing one or more cell searches and the UE establishing at least one radio resource management connection, e.g. a Radio Resource Control protocol (RRC) connection, with the gNB. Examples of the data transmission comprise the gNB transmitting ephemeris data of the gNB to the UE and the gNB transmitting coverage availability estimates of the gNB to the UE.

In an example in accordance with at least some embodiments, phase 704 comprises receiving, at the UE, ephemeris data for the gNB. The UE may use the ephemeris data at least for determining a geographical location of the gNB and/or estimating periodicity of the coverage availability estimates for the gNB.

Phases 706 and 710 comprise determining coverage availability estimates associated with geographical locations of the gNB. The coverage availability estimates may indicate whether coverage of the gNB is available or unavailable, or a likelihood of coverage. The coverage availability estimates are at least partially determined at the UE on the basis of one or more measurements of at least one of signal strength and a signal quality of the mobile non-terrestrial access node. In this way the coverage availability estimates are associated with the geographical location of the UE and a time at which the coverage availability is determined. Examples of signal strength measurements comprise a Received Signal Strength Indicator (RSSI) measurement, a Reference Signal Received Power (RSRP) measurement. A signal quality may be measured on the basis of a Reference Signal Received Quality measurement. Examples of the signal strength measurements may be referred to in TS36.214 for LTE, TS38.214 for 5G NR. In an example, the coverage availability estimate is sampled by the UE using a sampling time interval x [ms].

Phase 706 comprises determining, at the UE, that the UE is within the coverage area of the gNB. Then a coverage availability estimate may be determined to indicate an availability of a coverage of the gNB. In an example, the availability may be determined on the basis of a signal strength or a signal quality of the mobile non-terrestrial access node. In an example a signal strength may be measured by performing one or more measurements for received signal strength from the mobile non-terrestrial access node. In an example if the RSRP is greater than a threshold for the power P1, a coverage availability estimate may be determined to indicate an availability of a coverage of the mobile non-terrestrial access node. On the other hand, if the RSRP is less than a threshold for the power P2, a coverage availability estimate may be determined to indicate an unavailability of a coverage of the mobile non-terrestrial access node. It should be appreciated that since UEs may employ different antennas and Radio Frequency (RF) front ends, their needs in terms of radio coverage may vary and therefore the thresholds P1 and P2 for the power are implementation specific parameters. In an example, one or more of the thresholds P1 and P2 may be determined at the UE on the basis of receiver sensitivity, potentially with an added margin, of the UE. The value of the margin may be known/estimated and configured to the UE during development of the UE.

In an example in accordance with at least some embodiments, the coverage availability estimates indicate at least one of an availability, an unavailability and a likelihood of coverage of the gNB at geographical locations of the gNB. Following the example given above with phase 706 for the coverage availability estimates indicating an availability or an unavailability, if the RSRP is greater than a threshold for the power P1, the availability may be marked to a binary vector to indicate availability. Following the example given above with phase 706, if the RSRP is less than a threshold for the power P2, the unavailability may be marked to a binary vector to indicate unavailability. Accordingly, the bits for the availability and unavailability may differ in the bit vector. Following the example given above with phase 706 for the coverage availability estimates indicating a likelihood of coverage of the gNB, if the RSRP is greater than a threshold for the power P1, a likelihood of coverage may be incremented/updated for a given time and geographical location of the gNB to indicate availability of the coverage. Following the example given above with phase 706, if the RSRP is less than a threshold for the power P2, a likelihood of coverage may be decreased/updated for a given time and geographical location of the gNB to indicate unavailability of the coverage. The updating of the likelihood parameter can e.g. be based on the number of samples available for the current geographical location of the gNB (both observed at the current time and at past fly-overs) and the sum of available and unavailable coverage availability estimates. Alternatively, the likelihood estimate may be based on a moving average filter or another type of filtering or using machine learning techniques. The exact estimation algorithm may be implementation/vendor specific.

Phase 708 comprises the gNB being about to leave area of the UE. The area of the UE may be understood as a communications range of the UE and the gNB. The communications range may be defined by a distance between the UE and the gNB. Accordingly, the area of the UE may comprise an area within which the gNB and the UE may communicate over a wireless link.

Phase 710 comprises determining, at the UE, that the UE is not within the coverage area of the gNB. Then a coverage availability estimate may be determined to indicate an unavailability of a coverage of the gNB. The unavailability may be determined as described with phase 706 above. In an example, when the gNB is determined unavailable, a timer may be started. The timer may be used to control a time period of unavailability before the UE may enter a power save mode. In an example, the timer may be a counter y, that is updated, e.g. increased or decreased, every time the unavailability is determined. The counter may be associated with an unavailability threshold z. The counter y together with the unavailability threshold z may determine how fast the UE may enter a power saving mode. Once unavailability of coverage of the mobile non-terrestrial access node has been observed for y that is greater or equal to z, the UE may enter a power saving mode. Given the sampling period x of the coverage availability estimate the counter effectively serves as a timer and the threshold z as a time limit. It should be appreciated that the z and y can be used to measure unavailability, as described, or availability.

In accordance with at least some embodiments, the coverage availability estimates determined in phases 706 and 710 may be stored associated with one or more of a geographical area of the UE on the Earth surface, a geographical location of the gNB and a periodicity of a trajectory or a flight path of the gNB. In an example, the coverage availability estimates may be stored to a database of coverage availability estimates. The database may be maintained at the UE or at a network accessible service entity. When maintained at the network accessible service entity, the coverage availability estimates may be transmitted to the network accessible service entity and optionally with one or more of information indicating a geographical location of the UE and ephemeris data of the gNB.

Phases 712 to 722 comprise determining further coverage availability estimates associated with geographical locations of the gNB. The further coverage availability estimates may be determined until the coverage availability estimate indicates a periodic coverage of the gNB.

Phase 712 comprises the gNB returning to the area of the UE.

Phase 714 comprises the UE determining that the gNB is available, for example in accordance with phase 706. In this way one or more new coverage availability estimates may be determined.

Phase 716 comprises updating the coverage availability estimates. Updating the coverage availability estimates may comprise the UE storing the new determined coverage availability estimates for example to the database of coverage availability estimates as described above in connection with phase 706 and 710. Repetition of the phases 712 to 722 provides that in time a sufficient number of coverage availability estimates is determined, whereby the determined coverage availability estimates may indicate a periodic coverage of the gNB. If the coverage availability estimates indicate a periodic coverage the UE may determine a power save mode or one or more connection attempts to the mobile non-terrestrial access node, on the basis of a time period according to a periodicity of the determined coverage availability estimates. In this way the power save mode may be entered by the UE such that the UE may wake up in time, when there is coverage by the gNB, and the connection attempts may be controlled by the UE to avoid unnecessary connection attempts when the is no coverage.

Phase 718 comprises communications between the UE and the gNB for example as described in phase 704.

Phase 720 comprises the gNB leaving the area of the UE for example as described with phase 708.

Phase 722 comprises the UE determining that the gNB is unavailable for example as described with phase 710.

Phase 724 comprises the gNB returning to the area of the UE, when the UE has determined coverage availability estimates that indicate a periodic coverage of the gNB.

Phase 726 comprises the UE waking up from a power save mode or one or more connection attempts to the gNB according to a periodicity of the coverage availability estimate. At least in some embodiments, the coverage availability estimates may indicate a likelihood of coverage which provide that a likelihood may be evaluated against a threshold such that it may be ascertained that the coverage is sufficient to avoid retransmissions of connection attempts and/or data.

It should be appreciated that before the determined coverage availability estimates that indicate a periodic coverage, for example in phase 710, the UE may enter the power saving mode for time periods that are less than an estimated periodicity of the determined coverage availability estimates. Accordingly, the time periods may be relatively such that the UE may increased the likelihood of being awake for determining whether a coverage of the gNB is available or unavailable.

Phase 728 comprises updating the coverage availability estimates for example in accordance with phase 716.

Figure 8:
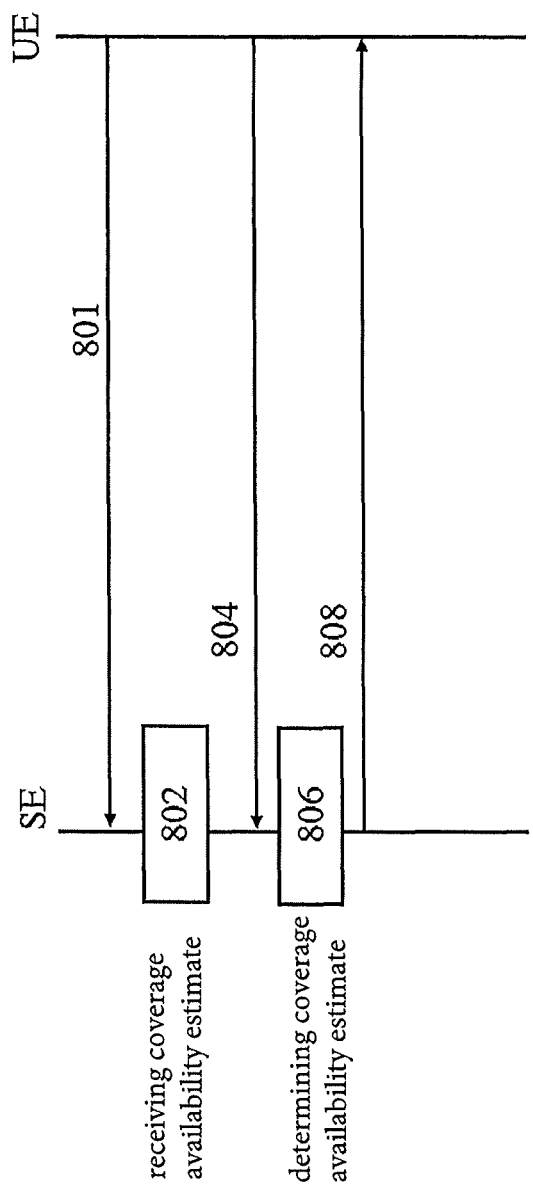
FIG. 8 illustrates an example of a sequence in accordance with at least some embodiments of the present invention.

FIG. 8 illustrates an example of a sequence in accordance with at least some embodiments of the present invention. The sequence is illustrated between a wireless device, e.g. UE and a network accessible service entity (SE). The UE may be connected to the SE via a mobile non-terrestrial access node, e.g. gNB located on a LEO satellite or a HAPS, of a wireless communication system. On the other hand, the UE may be connected to the SE via a terrestrial access node of the communication system, when there is no coverage of the mobile non-terrestrial access node. The sequence provides at least an option for the UE to use the SE as additional source of coverage availability estimates, or rely entirely on it in which case the UE may be freed from determining and updating a coverage availability database. In an example in accordance with at least some embodiments, the SE may be a cloud application server, where the coverage availability estimates are stored to a cloud database.

Phase 801 may comprise the UE transmitting coverage availability estimates to the SE. The coverage availability estimates may have been determined by the UE for example as described with phase 504 in FIG. 5. In an example, the UE may transmit the coverage availability estimates to the SE for sharing the coverage availability estimates. It should be appreciated that the UE may share the coverage availability estimates provided that there is a connection via which the SE may be reached by the UE. Therefore, coverage availability estimates may be shared via gNB or via another access node that may be part of a terrestrial access network. In an example, the UE may transmit to the SE in addition to the coverage availability estimates, also at least one of a current geographical location of the UE and an identified, e.g. cell_ID, of last/current serving cell of the UE together with time information.

Phase 802 comprises the SE receiving coverage availability estimates from one or more UE. In this way the SE may maintain a database of coverage availability estimates. In addition to the coverage availability estimates, the SE may receive from the UE at least one of a current geographical location of the UE, an identified, e.g. cell_ID, of last/current serving cell of the UE and beam identifier together with time information. Access to the coverage availability estimates may be provided to the UE e.g. based on subscriptions to service provided by the SE. In this way the SE supports sharing of the coverage availability estimates between UE. The coverage availability estimates may be determined for example in accordance with phases 706 and 710 in FIG. 7.

Phase 804 comprises the SE receiving at least one request from the UE for coverage availability estimates of gNBs. In an example the request may comprise at least one of a current geographical location of the UE, an identified, e.g. cell_ID, of last/current serving cell of the UE and beam identifier together with time information.

Phase 806 comprises the SE determining one or more coverage availability estimates of the gNB associated with the geographical location of the UE. In this way coverage availability estimates of the gNB that is moving over the geographical location of the UE may be determined. The geographical location of the UE may be determined based on the information received with the request or the geographical location of the UE may be estimated.

Phase 808 comprises the SE transmitting, if the determined coverage availability estimates indicate a periodic coverage of the gNB, the determined coverage availability estimates to the UE. In an example the determined coverage availability estimates may be transmitted as part of one or more RRC messages or by application layer signaling.

It should be appreciated that in phase 808 the coverage availability estimate transmitted to the UE should indicate a periodic coverage of the gNB such that the UE may utilize the coverage availability estimate for entering a power save mode, waking-up from the power save mode and/or controlling one or more connection attempts to the gNB. Therefore, in an example phase 806 may comprise determining if the determined coverage availability estimate indicates a periodic coverage of the gNB, whereby the SE may determine whether phase 808 is performed or not.

In an embodiment, phase 808 comprises determining a transmission time instant for transmitting the coverage availability estimates according to a periodicity of the determined coverage availability estimates. In this way the determined coverage availability estimates may be transmitted to the UE, when the UE is within a coverage area of the gNB.

In an example in accordance with at least some embodiments, phase 806 comprises transforming the coverage availability estimates indicating a likelihood of coverage into a throughput estimate and/or a latency estimate. Then phase 808 comprises determining one or more time slots for a data transmission on the basis of the throughput estimate and/or the latency estimate, and causing the data transmission on the determined time slots to the UE. In this way the number of required transmissions and/or the data rate may be kept at acceptable levels and thus supporting power saving at the UE.

In an example according to at least some embodiments phase 802 comprises the SE combining, cleaning up and/or updating the coverage availabilities received from the UE.

Figure 9:
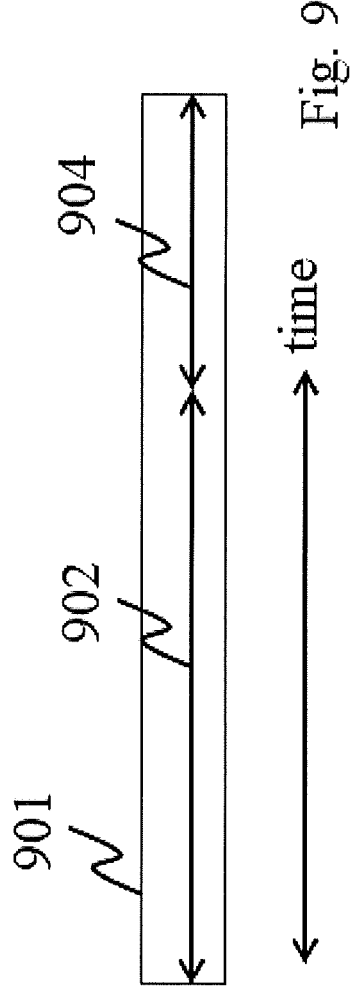
FIG. 9 and FIG. 10 illustrates examples of coverage availability estimates, in accordance with at least some embodiments of the present invention.
Figure 10:
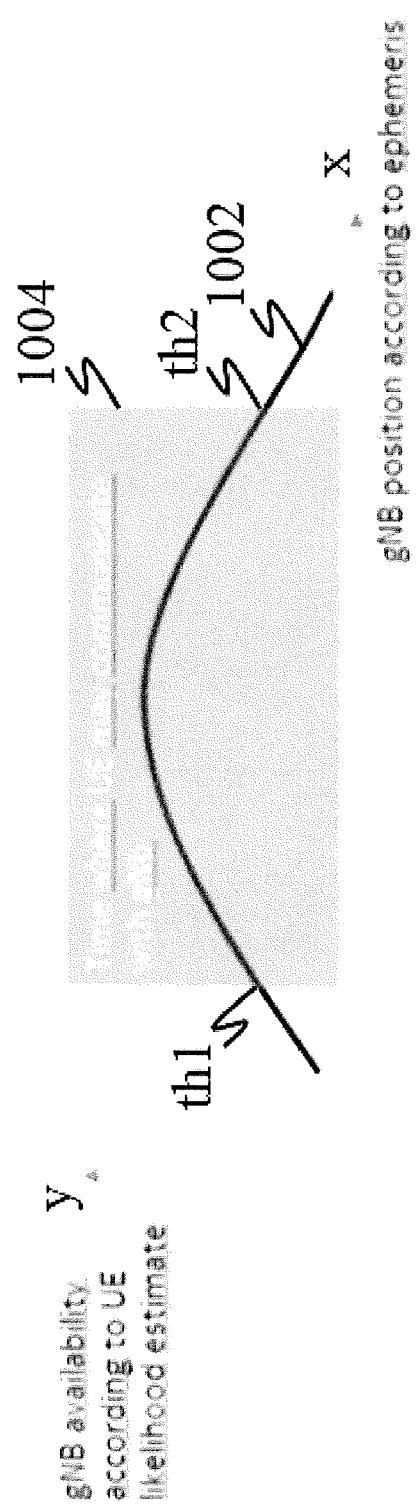

FIG. 9 and FIG. 10 illustrate coverage availability estimates in accordance with at least some embodiments of the present invention. The coverage availability estimates may be used at a wireless device for determining at least some of: when the wireless device should initiate a connection attempt to the mobile non-terrestrial access node, when the wireless device should not initiate a connection attempt to the mobile non-terrestrial access node, when a wireless device should enter a power saving mode and/or when a wireless device should leave a power saving mode.

Referring to FIG. 9, the coverage availability estimates 901 indicate an availability 904 or unavailability 902 of a mobile non-terrestrial access node at geographical locations of the mobile non-terrestrial access node. In an example the coverage availability estimates are a binary vector, where availability 904 and unavailability 902 are indicated by different bit values '0' and '1'. Given the sampling time x of the coverage availability, the wireless device may determine the number of consecutive samples with coverage followed by the number of consecutive samples without coverage. The length of the binary vector may thus match the fly-over periodicity of the mobile non-terrestrial access node, i.e. the frequency with which the coverage is available. The coverage availability estimates that indicate availability or unavailability may form time intervals. Accordingly, the coverage availability estimates that indicate availability may form time intervals 904 that are repeated periodically. In this way the coverage availability estimates indicate a periodic coverage of the mobile non-terrestrial access node. The coverage availability estimates that indicate unavailability may form time intervals 902 that are between the time intervals 904 corresponding to the coverage availability estimates that indicate availability.

Referring to FIG. 10 the coverage availability estimates indicate a likelihood 1002 of coverage of a mobile non-terrestrial access node at geographical locations of the mobile non-terrestrial access node. The likelihood of coverage, illustrated by a curve, indicates the likelihood of the coverage being available, as compared to the binary vector described with FIG. 9. The likelihood 1002 of coverage is illustrated on y-axis and a geographical location of the mobile non-terrestrial access node on x-axis. A wireless device may be determined to be within a coverage area of the mobile non-terrestrial access node, when the likelihood 1002 exceeds a threshold value th1, th2. The time 1004, the wireless device is within the coverage of the mobile non-terrestrial access node is illustrated by a box in FIG. 10. Then, the mobile non-terrestrial access node may be determined available. On the other hand, when the likelihood is below the threshold values, the wireless device may be determined to be out of coverage of the mobile non-terrestrial access node. Then the, mobile non-terrestrial access node may be determined unavailable.

In accordance with at least some embodiments, the coverage availability estimates indicating a likelihood of coverage, for example the curve illustrated in FIG. 10, may be transformed into a throughput estimate and/or a latency estimate. Then a wireless device and/or a network accessible service entity may determine one or more time slots for a data transmission on the basis of the throughput estimate and/or the latency estimate, and cause the data transmission on the determined time slots. In this way the wireless device may cause the data transmission to the mobile non-terrestrial access node, while the number of required transmissions and/or the data rate may be kept at acceptable levels and thus supporting power saving at the wireless device. Also regarding the data transmissions from the network accessible service entity to the wireless device, data transmissions on the determined time slots provide that the number of required transmissions and/or the data rate may be kept at acceptable levels and thus supporting power saving at the wireless device. In an example, the throughput estimate, or the latency estimate, may be represented by a curve that indicates a potential throughput for a data transmission to a mobile non-terrestrial access node. In an example, the coverage availability estimates indicating a likelihood of coverage may be transformed into a throughput indicator by mapping, e.g. from RSRP or RSRQ, to throughput or through learning from the past. When this throughput estimate is known, the wireless device or the network accessible service entity may determine one or more preferred time slots, e.g. time slots having the highest throughput, for a data transmission. It should be appreciated that for determining the preferred time slots with respect to the potential throughput according to the throughput estimate, the payload to be transmitted should be known. It should be appreciated that the above examples regarding throughput estimate or throughput indicator may be performed in a similar manner for a latency estimate or a latency indicator.

Figure 11:
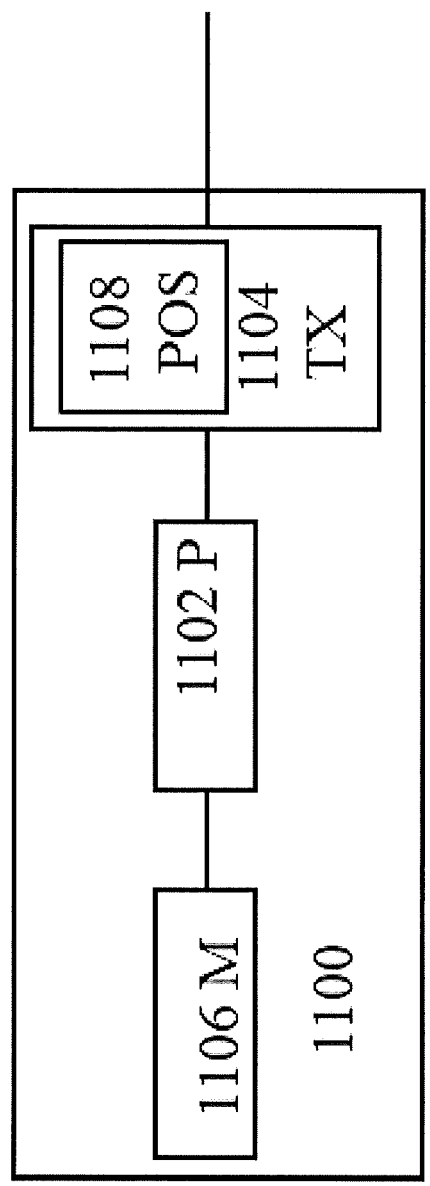
FIG. 11 illustrates a block diagram of an apparatus accordance with at least some embodiments of the present invention.

FIG. 11 illustrates an example of a block diagram of an apparatus in accordance with at least some embodiments of the present invention. The apparatus 1100 comprises a processor 1102 and a transceiver 1104. The processor is operatively connected to the transceiver for controlling the transceiver. The apparatus may comprise a memory 1106. The memory may be operatively connected to the processor. It should be appreciated that the memory may be a separate memory or included to the processor and/or the transceiver. The apparatus may be a wireless device or a network accessible service entity, for example.

In accordance with at least some embodiments, the apparatus, comprises a positioning unit or circuitry 1108. The positioning unit or circuitry is configured to process at least one of a current geographical location of the UE, an identified, e.g. cell_ID, of last/current serving cell of the UE and beam identifier together with time information, and ephemeris data for determining one or more geographical locations of wireless devices and/or mobile non-terrestrial access nodes.

According to an embodiment, the processor is configured to control the transceiver and/or to perform one or more functionalities described with a method according to an embodiment.

According to an embodiment, there is provided a wireless device comprising means for determining, at the wireless device, an availability of a connection to a mobile non-terrestrial access node of a wireless communication system; means for determining, at the wireless device, coverage availability estimates associated with geographical locations of the mobile non-terrestrial access node; and means for determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

According to an embodiment, there is provided a network accessible service entity comprising means for receiving, at the network accessible service entity from one or more wireless devices, coverage availability estimates associated with geographical locations of one or more mobile non-terrestrial access nodes of a communication system; and means for receiving, at the network accessible service entity from a wireless device, at least one request for coverage availability estimates of the mobile non-terrestrial access nodes; means for determining, at the network accessible service entity, one or more coverage availability estimates of a mobile non-terrestrial access node associated with a geographical location of the wireless device; and means for transmitting, if the determined coverage availability estimates indicate a periodic coverage of the mobile non-terrestrial access node, the determined coverage availability estimates to the wireless device.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a network accessible service entity, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by SYNOPSYS®, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
  (i) a combination of analogue and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

EXAMPLES

The following is a list of examples in accordance with at least some embodiments:

1. example: A wireless device comprising:
   means for determining, at the wireless device, an availability of a connection to a mobile non-terrestrial access node of a wireless communication system;
   means for determining, at the wireless device, coverage availability estimates associated with geographical locations of the mobile non-terrestrial access node; and
   means for determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

2. example: The wireless device according to example 1, comprising:
   means for entering, by the wireless device, if the determined coverage availability estimates fail to indicate the periodic coverage of the mobile non-terrestrial access node, the power saving mode for a time period that is less than an estimated periodicity of the determined coverage availability estimates.

3. example: The wireless device according to example 1 or 2, comprising:
   means for entering, by the wireless device, if the wireless devices has been out of coverage of the mobile non-terrestrial access node for a time period that exceeds a threshold value, the power save mode for a time period according to the periodicity of the determined coverage availability estimates.

4. example: The wireless device according to any of examples 1 to 3, comprising:
   means for determining, in response to detecting a movement of the wireless device, at least one coverage availability estimate.

5. example: The wireless device according to any of examples 1 to 4, comprising:
   means for determining, at the wireless device, whether the wireless device is within a coverage area of the mobile non-terrestrial access node;
   means for determining, at the wireless device, if the wireless device is within the coverage area, a coverage availability estimate to indicate an availability of a coverage of the mobile non-terrestrial access node; and
   means for determining, at the wireless device, if the wireless device is not within the coverage area, a coverage availability estimate to indicate an unavailability of a coverage of the mobile non-terrestrial access node.

6. example: The wireless device according to any of examples 1 to 5, wherein the coverage availability estimates indicate at least one of an availability, an unavailability and a likelihood of coverage of the mobile non-terrestrial access node at geographical locations of the mobile non-terrestrial access node.

7. example: The wireless device according to example 6, comprising:
   means for transforming the coverage availability estimates indicating a likelihood of coverage into a throughput estimate and/or a latency estimate;
   means for determining one or more time slots for a data transmission on the basis of the throughput estimate and/or the latency estimate; and
   means for causing the data transmission on the determined time slots to the mobile non-terrestrial access node.

8. example: The wireless device according to any of examples 1 to 7, wherein the coverage availability estimates are at least partially determined at the wireless device on the basis of one or more measurements of at least one of signal strength and a signal quality of the mobile non-terrestrial access node.

9. example: The wireless device according to any of examples 1 to 8, wherein the coverage availability estimates are at least partially determined by a network accessible service entity, the wireless device comprising:
   means for transmitting, by the wireless device, a request for coverage availability estimates of one or more mobile non-terrestrial access nodes to a network accessible service entity; and
   means for receiving, at the wireless device, the coverage availability estimates of the mobile non-terrestrial access node associated with a current geographical location of the wireless device from the network accessible service entity.

10. example: The wireless device according to any of examples 1 to 9, comprising:
    means for receiving, at the wireless device, ephemeris data for the mobile non-terrestrial access node;
    means for determining, at the wireless device, a geographical location of the mobile non-terrestrial access node on the basis of the received ephemeris data; and
    means for storing the determined coverage availability estimates in association with at least part of the received ephemeris data and the determined geographical location of the mobile non-terrestrial access node.

11. example: A network accessible service entity, comprising:
    means for receiving, at the network accessible service entity from one or more wireless devices, coverage availability estimates associated with geographical locations of one or more mobile non-terrestrial access nodes of a communication system; and
    means for receiving, at the network accessible service entity from a wireless device, at least one request for coverage availability estimates of the mobile non-terrestrial access nodes;
    means for determining, at the network accessible service entity, one or more coverage availability estimates of a mobile non-terrestrial access node associated with a geographical location of the wireless device; and
    means for transmitting, if the determined coverage availability estimates indicate a periodic coverage of the mobile non-terrestrial access node, the determined coverage availability estimates to the wireless device.

12. example: The network accessible service entity according to example 11, comprising:
    means for determining a transmission time instant for transmitting the determined coverage availability estimates according to a periodicity of the determined coverage availability estimates.

13. example: The network accessible service entity according to example 11 or 12, comprising:

means for transforming the coverage availability estimates indicating a likelihood of coverage into a throughput estimate and/or a latency estimate;

means for determining one or more time slots for a data transmission on the basis of the throughput estimate and/or the latency estimate; and means for causing the data transmission on the determined time slots to the wireless device.

14. example: The network accessible service entity according to example 11, 12 or 13, comprising:

means for receiving, at the network accessible service entity, ephemeris data for the mobile non-terrestrial access nodes;

means for determining, at the network accessible service entity, geographical locations of the mobile non-terrestrial access nodes on the basis of the received ephemeris data; and means for storing the received coverage availability estimates in association with at least part of the received ephemeris data and the geographical location of the mobile non-terrestrial access nodes.

15. example: A method comprising:

determining, at a wireless device, an availability of a connection to a mobile non-terrestrial access node of a wireless communication system;

determining, at the wireless device, coverage availability estimates associated with geographical locations of the mobile non-terrestrial access node; and determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.

16. example: The method according to example 15, comprising:

entering, by the wireless device, if the determined coverage availability estimates fail to indicate the periodic coverage of the mobile non-terrestrial access node, the power saving mode for a time period that is less than an estimated periodicity of the determined coverage availability estimates.

17. example: The method according to example 15 or 16, comprising:

entering, by the wireless device, if the wireless devices has been out of coverage of the mobile non-terrestrial access node for a time period that exceeds a threshold value, the power save mode for a time period according to the periodicity of the determined coverage availability estimates.

18. example: The method according to example 15, 16 or 17, comprising:

determining, in response to detecting a movement of the wireless device, at least one coverage availability estimate.

19. example: The method according to any of examples 15 to 18, comprising:

determining, at the wireless device, whether the wireless device is within a coverage area of the mobile non-terrestrial access node; and determining, at the wireless device, if the wireless device is within the coverage area, a coverage availability estimate to indicate an availability of a coverage of the mobile non-terrestrial access node; and determining, at the wireless device, if the wireless device is not within the coverage area, a coverage availability estimate to indicate an unavailability of a coverage of the mobile non-terrestrial access node.

20. example: The method according to any of examples 15 to 19, wherein the coverage availability estimates indicate at least one of an availability, an unavailability and a likelihood of coverage of the mobile non-terrestrial access node at geographical locations of the mobile non-terrestrial access node.

21. example: The method according to example 20, comprising:

transforming the coverage availability estimates indicating a likelihood of coverage into a throughput estimate and/or a latency estimate;

determining one or more time slots for a data transmission on the basis of the throughput estimate and/or the latency estimate; and causing the data transmission on the determined time slots to the mobile non-terrestrial access node.

22. example: The method according to any of examples 15 to 21, wherein the coverage availability estimates are at least partially determined at the wireless device on the basis of one or more measurements of at least one of signal strength and a signal quality of the mobile non-terrestrial access node.

23. example: The method according to any of examples 15 to 22, wherein the coverage availability estimates are at least partially determined by a network accessible service entity, the method comprising:

transmitting, by the wireless device, a request for coverage availability estimates of one or more mobile non-terrestrial access nodes to a network accessible service entity; and receiving, at the wireless device, the coverage availability estimates of the mobile non-terrestrial access node associated with a current geographical location of the wireless device from the network accessible service entity.

24. example: The method according to any of examples 15 to 23, comprising:

means for receiving, at the wireless device, ephemeris data for the mobile non-terrestrial access node;

means for determining, at the wireless device, a geographical location of the mobile non-terrestrial access node on the basis of the received ephemeris data; and means for storing the determined coverage availability estimates in association with at least part of the received ephemeris data and the determined geographical location of the mobile non-terrestrial access node.

25. example: A method comprising:

receiving, at a network accessible service entity from one or more wireless devices, coverage availability estimates associated with geographical locations of one or more mobile non-terrestrial access nodes of a communication system; and receiving, at the network accessible service entity from a wireless device, at least one request for coverage availability estimates of the mobile non-terrestrial access nodes;

determining, at the network accessible service entity, one or more coverage availability estimates of a mobile non-terrestrial access node associated with a geographical location of the wireless device; and transmitting, if the determined coverage availability estimates indicate a periodic coverage of the mobile non-terrestrial access node, the determined coverage availability estimates to the wireless device.

26. example: The method according to example 25, comprising:
determining a transmission time instant for transmitting the determined coverage availability estimates according to a periodicity of the determined coverage availability estimates.
27. example: The method according to examples 25 or 26, transforming the coverage availability estimates indicating a likelihood of coverage into a throughput estimate and/or a latency estimate;
determining one or more time slots for a data transmission on the basis of the throughput estimate and/or the latency estimate; and
causing the data transmission on the determined time slots to the wireless device.
28. example: The method according to any of examples 25 to 27, comprising:
receiving, at the network accessible service entity, ephemeris data for the mobile non-terrestrial access nodes;
determining, at the network accessible service entity, geographical locations of the mobile non-terrestrial access nodes on the basis of the received ephemeris data; and
storing the received coverage availability estimates in association with at least part of the received ephemeris data and the geographical location of the mobile non-terrestrial access nodes.
29. example: A wireless device comprising:
a processor; and a transceiver;
wherein the processor is configured to:
determine an availability of a connection to a mobile non-terrestrial access node of a wireless communication system;
determine coverage availability estimates associated with geographical locations of the mobile non-terrestrial access node; and
determine, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.
30. example: A network accessible service entity comprising:
a processor; and
a transceiver;
wherein the processor is configured to:
control the transceiver to receive from one or more wireless devices coverage availability estimates associated with geographical locations of one or more mobile non-terrestrial access nodes of a communication system; and
control the transceiver to receive from a wireless device at least one request for coverage availability estimates of the mobile non-terrestrial access nodes;
determine one or more coverage availability estimates of a mobile non-terrestrial access node associated with a geographical location of the wireless device; and
control the transceiver to transmit, if the determined coverage availability estimates indicate a periodic coverage of the mobile non-terrestrial access node, the determined coverage availability estimates to the wireless device.
31. example: A computer program comprising computer readable program code means adapted to perform at least the following:
determining, at a wireless device, an availability of a connection to a mobile non-terrestrial access node of a wireless communication system;
determining, at the wireless device, coverage availability estimates associated with geographical locations of the mobile non-terrestrial access node; and
determining at the wireless device, if the determined coverage availability estimates indicate a periodic coverage of the mobile non-terrestrial access node, a power save mode or one or more connection attempts to the mobile non-terrestrial access node, on the basis of a time period according to a periodicity of the determined coverage availability estimates.
32. example: A computer program comprising computer readable program code means adapted to perform at least the following:
receiving, at a network accessible service entity from one or more wireless devices, coverage availability estimates associated with geographical locations of one or more mobile non-terrestrial access nodes of a communication system; and
receiving, at the network accessible service entity from a wireless device, at least one request for coverage availability estimates of the mobile non-terrestrial access nodes;
determining, at the network accessible service entity, one or more coverage availability estimates of a mobile non-terrestrial access node associated with a geographical location of the wireless device; and
transmitting, if the determined coverage availability estimates indicate a periodic coverage of the mobile non-terrestrial access node, the determined coverage availability estimates to the wireless device.
33. example: The computer program according to example 31 or 32 embodied on a computer readable medium.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:
1. A wireless device comprising:
circuitry configured to determine, at the wireless device, an availability of a connection to a mobile non-terrestrial access node of a wireless communication system;
circuitry configured to determine, at the wireless device, coverage availability estimates associated with geographical locations of the mobile non-terrestrial access node, wherein the coverage availability estimates are determined based, at least partially, on one or more measurements, made with the wireless device, of at least one of: signal strength, or a signal quality, of the mobile non-terrestrial access node;
circuitry configured to determine, at the wireless device, whether the determined coverage availability estimates indicate a periodic coverage of the mobile non-terrestrial access node; and
circuitry configured, in response to determining whether the determined coverage availability estimates indicate the periodic coverage of the mobile non-terrestrial access node, to cause the wireless device to one of:
enter a power save mode, or control one or more connection attempts to the mobile non-terrestrial access node, on the basis of a time period according to a periodicity of the determined coverage availability estimates.

2. The wireless device according to claim 1, comprising: circuitry configured to enter, with the wireless device, the power save mode for a time period that is less than an estimated periodicity of the determined coverage availability estimates in response to a determination that the determined coverage availability estimates fail to indicate the periodic coverage of the mobile non-terrestrial access node.

3. The wireless device according to claim 1, comprising: circuitry configured to enter, with the wireless device, the power save mode for a time period according to the periodicity of the determined coverage availability estimates in response to a determination that the wireless device has been out of coverage of the mobile non-terrestrial access node for a time period that exceeds a threshold value.

4. The wireless device according to claim 1, comprising: circuitry configured to determine, in response to detecting a movement of the wireless device, at least one coverage availability estimate.

5. The wireless device according to claim 1, comprising: circuitry configured to determine, at the wireless device, whether the wireless device is within a coverage area of the mobile non-terrestrial access node;

circuitry configured to determine, at the wireless device, a coverage availability estimate to indicate an availability of a coverage of the mobile non-terrestrial access node in response to a determination that the wireless device is within the coverage area; and circuitry configured to determine, at the wireless device, a coverage availability estimate to indicate an unavailability of the coverage of the mobile non-terrestrial access node in response to a determination that the wireless device is not within the coverage area.

6. The wireless device according to claim 1, wherein the coverage availability estimates indicate at least one of an availability, an unavailability or a likelihood of coverage of the mobile non-terrestrial access node at the geographical locations of the mobile non-terrestrial access node.

7. The wireless device according to claim 1, wherein the circuitry configured to determine the coverage availability estimates further comprise:

circuitry configured to transmit, with the wireless device, a request for stored coverage availability estimates of one or more mobile non-terrestrial access nodes to a network accessible service entity; and circuitry configured to receive, at the wireless device, the stored coverage availability estimates of at least one of the one or more mobile non-terrestrial access nodes associated with a current geographical location of the wireless device from the network accessible service entity.

8. The wireless device according to claim 1, comprising: circuitry configured to receive, at the wireless device, ephemeris data for the mobile non-terrestrial access node;

circuitry configured to determine, at the wireless device, a geographical location of the mobile non-terrestrial access node on the basis of the received ephemeris data; and circuitry configured to store the determined coverage availability estimates in association with at least part of the received ephemeris data and the determined geographical location of the mobile non-terrestrial access node.

9. A method comprising:

determining, at a wireless device, an availability of a connection to a mobile non-terrestrial access node of a wireless communication system;

determining, at the wireless device, coverage availability estimates associated with geographical locations of the mobile non-terrestrial access node, wherein the coverage availability estimates are determined based, at least partially, on one or more measurements, made with the wireless device, of at least one of: signal strength, or a signal quality, of the mobile non-terrestrial access node;

determining, at the wireless device, whether the determined coverage availability estimates indicate a periodic coverage of the mobile non-terrestrial access node; and in response to determining whether the determined coverage availability estimates indicate the periodic coverage of the mobile non-terrestrial access node, causing the wireless device to one of:

enter a power save mode, or control one or more connection attempts to the mobile non-terrestrial access node, on the basis of a time period according to a periodicity of the determined coverage availability estimates.

10. The method according to claim 9, comprising:

entering, with the wireless device, the power save mode for a time period that is less than an estimated periodicity of the determined coverage availability estimates in response to a determination that the determined coverage availability estimates fail to indicate the periodic coverage of the mobile non-terrestrial access node.

11. The method according to claim 9, comprising:

entering, with the wireless device, the power save mode for a time period according to the periodicity of the determined coverage availability estimates in response to a determination that the wireless device has been out of coverage of the mobile non-terrestrial access node for a time period that exceeds a threshold value.

12. The method according to claim 9, comprising:

determining, in response to detecting a movement of the wireless device, at least one coverage availability estimate.

13. The method according to claim 9, comprising:

determining, at the wireless device, whether the wireless device is within a coverage area of the mobile non-terrestrial access node; and determining, at the wireless device, a coverage availability estimate to indicate an availability of a coverage of the mobile non-terrestrial access node in response to a determination that the wireless device is within the coverage area; and determining, at the wireless device, a coverage availability estimate to indicate an unavailability of the coverage of the mobile non-terrestrial access node in response to a determination that the wireless device is not within the coverage area.

14. The method according to claim 9, wherein the coverage availability estimates indicate at least one of an availability, an unavailability or a likelihood of coverage of the mobile non-terrestrial access node at the geographical locations of the mobile non-terrestrial access node.

15. The method according to claim 9, wherein the determining of the coverage availability estimates further comprises:
- transmitting, with the wireless device, a request for stored coverage availability estimates of one or more mobile non-terrestrial access nodes to a network accessible service entity; and
- receiving, at the wireless device, the stored coverage availability estimates of at least one of the one or more mobile non-terrestrial access nodes associated with a current geographical location of the wireless device from the network accessible service entity.

16. The method according to claim 9, comprising:
- receiving, at the wireless device, ephemeris data for the mobile non-terrestrial access node;
- determining, at the wireless device, a geographical location of the mobile non-terrestrial access node on the basis of the received ephemeris data; and
- storing the determined coverage availability estimates in association with at least part of the received ephemeris data and the determined geographical location of the mobile non-terrestrial access node.

\* \* \* \* \*